United States Patent [19]

Wiley et al.

[11] 4,163,090
[45] Jul. 31, 1979

[54] PROCESS FOR PREPARING NORMALLY CRYSTALLINE VINYLIDENE HALIDE POLYMERS HAVING SUPERIOR FLOW PROPERTIES EMPLOYING A COMBINATION OF COLLOIDAL SILICA AND NON-IONIC WATER SOLUBLE CELLULOSE ETHER HAVING A VISCOSITY OF ABOUT 5 CP OR LESS AS STABILIZING AGENTS

[75] Inventors: Ralph M. Wiley; Merritt R. Meeks, both of Midland; Burke A. Beebe, Gladwin, all of Mich.

[73] Assignee: The Dow Chemical Company, Midland, Mich.

[21] Appl. No.: 836,935

[22] Filed: Sep. 27, 1977

[51] Int. Cl.$^2$ .................... C08F 2/20; C08F 4/34; C08F 114/08

[52] U.S. Cl. ........................ 526/88; 526/194; 526/200; 526/343; 526/909; 526/910

[58] Field of Search ............ 526/194, 200, 88, 909, 526/910, 343

[56] References Cited

U.S. PATENT DOCUMENTS

| | | | |
|---|---|---|---|
| 2,538,049 | 1/1951 | Schick | 526/343 |
| 2,538,050 | 1/1951 | Schick | 526/910 |
| 2,538,051 | 1/1951 | Schick | 526/200 |
| 2,886,559 | 5/1959 | Wiley | 526/194 |
| 2,932,629 | 4/1960 | Wiley | 526/200 |
| 2,934,530 | 4/1960 | Ballast et al. | 526/194 |
| 3,328,374 | 6/1967 | Ronden et al. | 526/909 |
| 3,375,238 | 3/1968 | Bauer | 526/909 |
| 3,592,800 | 7/1971 | Oschmann et al. | 526/909 |
| 3,615,972 | 10/1971 | Morehouse | 156/79 |
| 3,697,493 | 10/1972 | Meyer | 526/194 |
| 3,716,507 | 2/1973 | Glomski et al. | 526/910 |
| 3,719,651 | 3/1973 | Greminger | 526/200 |
| 3,786,115 | 1/1974 | Osuga et al. | 526/200 |
| 3,801,519 | 4/1974 | Brodof | 526/200 |
| 3,879,365 | 4/1975 | Greminger | 526/200 |
| 3,917,548 | 11/1975 | Harrington | 526/200 |

FOREIGN PATENT DOCUMENTS

| | | | |
|---|---|---|---|
| 802061 | 9/1958 | United Kingdom | 526/194 |
| 952351 | 3/1964 | United Kingdom | 526/194 |

Primary Examiner—Herbert J. Lilling
Attorney, Agent, or Firm—Thomas R. Wills

[57] ABSTRACT

Normally crystalline vinylidene halide polymers are prepared by an improved limited coalescence suspension polymerization reaction wherein colloidal silica is used as a solid particle emulsifier, and a low molecular weight, non-ionic, water-soluble cellulose ether, having a viscosity grade less than about 35 centipoise, is used as the stabilizing agent. Spheroidal polymer particles are obtained having a generally uniform, small size and superior flow properties.

7 Claims, No Drawings

4,163,090

PROCESS FOR PREPARING NORMALLY CRYSTALLINE VINYLIDENE HALIDE POLYMERS HAVING SUPERIOR FLOW PROPERTIES EMPLOYING A COMBINATION OF COLLOIDAL SILICA AND NON-IONIC WATER SOLUBLE CELLULOSE ETHER HAVING A VISCOSITY OF ABOUT 5 CP OR LESS AS STABILIZING AGENTS

BACKGROUND OF THE INVENTION

The present invention relates in general to a process for preparing normally crystalline vinylidene halide polymers. More specifically, it relates to an improved process for preparing these polymers by suspension polymerization whereby spheroidal globules of polymer can be obtained in a generally uniform and predetermined small size.

For purposes of this application, the term "normally crystalline vinylidene halide polymers" is meant to include the homopolymers and copolymers of vinylidene halides, such as vinylidene chloride, vinylidene bromide, and the like and interpolymers of a vinylidene halide with other monoethylenically unsaturated monomers, such as vinyl chloride, vinyl acetate, acrylonitrile, butyl acrylate, butadiene, and the like, wherein the vinylidene halide is present in predominant amount and preferably constitutes at least 50 percent of the weight of the monomeric material from which the copolymer is prepared. The normally crystalline vinylidene halide polymers have long been recognized as valuable materials for preparing films, foils, fibers, filaments and molded articles. Processes for preparing such polymers in aqueous emulsion or in non-emulsified aqueous suspension have been known for a long time. For several reasons the suspension techniques are preferred. Emulsion polymerization gives particles which frequency are so finely divided and of such low bulk density as to be inconvenient for use in molding or extrusion. Further, the emulsions require an extra coagulation step which is both costly and time consuming. Generally, in the suspension processes a water-soluble or water-dispersible granulating agent is used to cause the polymer to be in the form of spheres which are small enough to be easily handled yet large enough to be free flowing. When no granulating agent is used, the polymerizing particles agglomerate or coalesce into large, hard lumps of polymer which must be ground before use.

In U.S. Pat. No. 2,932,629, to R. M. Wiley, there is disclosed a process for preparing solid polymeric bodies in the form of spheroidal globules having substantially uniform size by forming a suspension of droplets of a polymerizable liquid, such as vinylidene chloride, in an aqueous non-solvent medium by vigorous agitation, and thereafter subjecting the suspension to a condition of quiescence whereby a limited coalescence of the dispersed polymerizable liquid occurs with the formation of a dispersion of a lesser number of larger, stable, uniform-sized droplets, the size of which depends in a predictable manner on the composition of the aqueous suspending medium, and subsequently polymerizing the droplets with a peroxy catalyst. That reference also teaches that in some instances, e.g., when polymerizing vinylidene chloride, it is beneficial to treat the uniform droplet suspension prior to polymerization so as to render the suspension stable against agglomeration of the oil droplets. The stabilization is accomplished by gently admixing with the uniform droplet suspension an agent capable of greatly increasing the viscosity of the aqueous liquid. Suitable agents are any water-soluble or water-dispersible thickening agents, such as sulfonated polystyrenes, hydrophilic clays, digested starch, natural gums, carboxy substituted cellulose ethers, and the like.

The process disclosed in U.S. Pat. No. 2,932,629 is not suitable, however, for preparing normally crystalline vinylidene halide polymers in the form of spheroidal globules having a generally uniform and small, e.g., about 40 microns or less, size. Furthermore, the suspensions of that process, when treated with thickening agents to prevent agglomeration of the oil droplets, are undesirably very viscous and difficult to handle without modification of conventional suspension polymerization equipment.

Accordingly, it would be desirable to have a process for preparing normally crystalline vinylidene halide polymers in the form of spheroidal globules which would not require thickening of the aqueous suspension in order to prevent the monomer oil droplets from agglomerating during polymerization. Furthermore, it would be desirable to have a process for preparing such polymers in the form of spherodial globules having a generally uniform size, especially a generally uniform, small size, e.g., about 40 microns or less.

SUMMARY OF THE INVENTION

The present invention provides an improvement in the process of making solid bodies of normally crystalline vinylidene halide polymers in the form of spheroidal globules comprising the steps of forming a mixture of a polymerizable liquid and an aqueous non-solvent liquid medium, the non-solvent liquid medium containing a water-dispersible, water-insoluble, colloidal solid particle emulsifier; mechanically agitating the mixture to disperse the polymerizable liquid as smaller-than-stable droplets in the non-solvent liquid medium; bringing the resulting unstable dispersion to a condition of quiescence, whereby the unstable drops undergo a limited coalescence to form a stable suspension of droplets; treating the stable suspension with a stabilizing agent to prevent agglomeration of the droplets; and thereafter subjecting the suspension to polymerization conditions. The improvement of the present invention comprises employing in combination colloidal silica as the solid particle emulsifier, and a low molecular weight, non-ionic, water-soluble cellulose ether, having a viscosity grade less than about 35 centipoise, as the stabilizing agent.

The process of the present invention is especially suitable for preparing solid polymeric bodies having a generally uniform, small size, e.g., about 40 microns or less. The diameter of the droplets of polymerizable liquid and hence the diameter of the beads of polymer, can be varied predictably, by deliberate variation of the composition of the aqueous non-solvent liquid medium. Since the bead size, e.g., diameter, in the present method is determined principally by the composition of the aqueous medium, the mechanical conditions, such as the size and design of the apparatus used, and the scale of operation, are not highly critical. Furthermore, by employing the same compositions, the operations can be repeated, or the scale of operations can be charged, and substantially the same results can be obtained. In addition to providing a method for preventing agglomeration of the polymerizable droplets without the need for highly turbulent agitation during polymerization, the present invention accomplishes this result without an appreciable increase in the viscosity of the suspension. Consequently, the problems inherent in handling a highly viscous suspension are avoided by the present invention.

The polymer particles prepared in accordance with this invention have superior flow properties because of their generally spheroidal shape and generally uniform, small size.

DETAILED DESCRIPTION AND EMBODIMENTS

Normally crystalline vinylidene halide polymers are prepared in accordance with the present invention by dispersing one part by volume of a polymerizable liquid into at least 0.5, preferably from 0.5 to about 10 or more, parts by volume of an aqueous non-solvent liquid medium comprising water and at least the first of the following ingredients:

(1). A water-dispersible, water-insoluble solid silica colloid, the particles of which, in aqueous dispersion, have dimensions in the order of from about 0.008 to about 0.1 micron, and preferably from about 0.008 to about 0.04 micron, which particles tend to gather at the liquid-liquid interface or are caused to do so by the presence of (2). A water-soluble "promotor" that affects the "hydrophilic-hydrophobic balance" of the solid colloid particles; and/or (3). An electrolyte, and, usually, (4). A water-soluble, monomer-insoluble polymerization inhibitor.

The solid colloidal silica material must be insoluble but dispersible in water, and non-dispersible in but wettable by the polymerizable liquid, i.e., the colloidal material must be much more hydrophilic than hydrophobic. The colloidal silica employed for limited coalescence consists of particles that, in the aqueous medium, retain a relatively rigid and discrete shape and size within the limits stated. The particles may be greatly swollen and extensively hydrated, provided that the swollen particle retains a definite shape, in which case the effective size is approximately that of the swollen particle. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the silica colloid tend to collect within the aqueous medium at the liquid-liquid interface, i.e., on the surface of the oil droplets. (The term "oil" is occasionally used herein as generic to liquids that are insoluble in water, i.e., the polymerizable liquids of the present invention.) Generally, it is desirable to add a "promoter" material to the aqueous medium to drive the solid colloid particles to the liquid-liquid interface. This phenomenon is well known in the surfactant art, and is here applied to solid colloidal particles as a means of adjusting the "hydrophilic-hydrophobic balance". Suitable for use with the colloidal silica particles are positively charged promoters such as tetramethyl ammonium hydroxide or chloride, or water-soluble complex resinous amine condensation products such as the water-soluble condensation products of diethanolamine and adipic acid, the water-soluble condensation products of ethylene oxide, urea, and formaldehyde, and polyethylenimine. Usually, the promoter need be used only to the extent of a few parts per million of aqueous medium, although larger proportions can often be tolerated. Generally, ionic materials normally classed as emulsifiers, such as the soaps, long chain sulfates and sulfonates are to be avoided since they will undesirably cause the formation of stable colloidal emulsions of the polymerizable liquid and the aqueous liquid medium.

An effect similar to that of organic promoters is often obtained with small amounts of electrolytes, e.g., water-soluble, ionizable akalies, acids and salts, particularly those having polyvalent ions. These are especially useful when the excessive hydrophilic or insufficient oleophilic characteristic of the colloid is attributable to excessive hydration of the collodial structure. The addition of a soluble, ionizable polyvalent cationic compound, such as an aluminium or calcium salt, to the aqueous composition causes extensive shrinking of the swollen colloid with exudation of apart of the associated water and exposure of the organic portion of the colloid particle, thereby making the colloidal more oleophilic.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The pH of the aqueous phase is not critical to, nor does it have an appreciable effect on, the polymer particle size. Beneficially, however, the pH should be adjusted to about 4.5 or less prior to adding the polymerizable liquid. Within that range, the surfaces of the resulting polymer particles are smooth; at a pH of about 5 or higher, the resulting polymer particles undesirably have deeply creased surfaces.

The aqueous medium containing the water-dispersible solid colloid is then admixed with the liquid polymerizable material in such a way as to disperse the liquid polymerizable material as small droplets within the aqueous medium. The dispersion can be accomplished by any usual means, e.g., by mechanical stirrers or shakers, by pumping through jets, by impingement, or by other procedures causing subdivision of the polymerizable material into droplets in a continuous aqueous medium. When dispersing the polymerizable liquid into an aqueous medium within a batch-process autoclave, the dispersion is advantageously carried out by circulating the mixture from the autoclave, through an external homogenizer, and back into autoclave so as to ensure complete dispersion; most beneficially, the recirculating procedure is continued for a period sufficient to ensure complete homogenizing of the entire mixture.

The degree of dispersion, e.g., by agitation, is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of generally uniform diameter that are stable in respect to further coalescence.

The principles underlying this phenomenon, as applied to suspension polymerization, are fully disclosed in U.S. Pat. No. 2,932,629, and are hereby incorporated by reference in the present application. Although not wishing to be bound by such theory, it is thought to be generally applicable to the present invention.

Polymer beads or globules having a particular size can be prepared by a limited coalescence method by preparing a dispersion of droplets of monomeric polymerizable liquids having a corresponding particular size. Generally, a simple preliminary test can be carried out in which a known volume of a polymerizable liquid is vigorously agitated with an aqueous suspending medium containing a known but arbitrarily selected quantity of a solid colloidal material capable of producing limited coalescence of the dispersed droplets. After such vigorous agitation and after a period of quiescence, the average diameter of the resulting stable droplets can be determined.

Having been prepared in the manner described above, the droplets are substantially stable against further coalescence but usually tend either to rise or to sink in the aqueous medium according to whether the density of the oil droplets is less than, or greater than, the density of the aqueous medium. In the practice of this invention, it is advantageous to treat the uniform droplet suspension prepared as described above to render the suspension stable against agglomeration of the oil droplets. This further stabilization is accomplished by gently admixing with the uniform droplet dispersion a stabilizing agent that is insoluble in the oil droplets and that does not remove the layer of solid colloidal particles covering the surface of the oil droplets at the oil-water interface. The stabilizing agents used in this invention are the low molecular weight, non-ionic, water-soluble cellulose ethers, e.g., methyl cellulose and the hydroxyalkyl methyl celluloses, such as hydroxyethyl methyl cellulose, hydroxypropyl methyl cellulose, and the like. A convenient description is obtained by referring to the viscosity of a two percent aqueous solution of the methyl cellulose measured at 20° C., i.e., the "viscosity grade". Viscosity grade is a measure of chain length and, therefore, of molecular size. Suitable for use in this invention are the low viscosity grades, preferably less than about 35 centipoise. The viscosity of cellulose ether to be used will depend, in a fashion similar to that described for the colloidal solid particle emulsifier, upon the size of the polymerizable liquid droplets within the suspension. Generally, smaller droplets will require a lower viscosity grade cellulose ether. By way of example, the preferred hydroxypropyl methyl cellulose viscosity grade needed to stabilize a suspension containing polymerizable droplets having an average size of about 20 microns is less than about 5 cp, and most preferably is about 3 cp or less. Normally, the amount of cellulose ether to be added in the form of a two percent solution in water will range from about 3.2 to about 12.8 weight percent, based on the weight of the aqueous liquid medium. Methods for preparng low viscosity grade cellulose ethers are known in the art and generally comprise degrading a high viscosity cellulose ether by acid hydrolysis until the desired viscosity is obtained.

The resulting dispersions are particularly well suited for use in continuous polymerization procedures that can be carried out in coils, tubes, and elongated vessels adapted for continuously introducing the dispersions into one end and for continuously withdrawing the mass of polymer beads from the other end. The polymerization step can also be practiced in batch manner.

Polymerization of the polymerizable liquid contained in the generally uniform-sized oil droplets dispersed in the aqueous suspension medium as just described can be effected by subjecting the dispersion to conditions conducive to polymerization, preferably in the absence of oxygen. Usually this is done by raising the temperature of the dispersion until polymerization of the polymerizable material is initiated and by maintaining those conditions until the polymerization is substantially complete. The temperature is not critical, and will normally range from about 40° C. to about 65° C. No agitation is required to maintain the polymerizing oil droplets in dispersed condition, although gentle agitation can be employed to assist in heat transfer. Generally, however, conditions of high turbulence should be strictly avoided. Because the droplets are held apart from one another during the polymerization without being subjected to mechanical stresses, the droplets retain their spheroidal shape. The resulting polymer beads are also nicely spheroidal, often almost perfectly spherical, and are substantially free of misshapen beads such as are often obtained when violent agitation is employed during polymerization. The beads are also free of adhesion to one another such as is often obtained in previous methods when the polymerizing globules were allowed to pack too closely together.

After the polymerization is substantially complete, the polymer beads can be collected, separated from the suspending medium, washed and otherwise treated in ways already known in this art.

Usually, in order to initiate polymerization, a suitable oil soluble catalyst can be employed by incorporating it in the monomer liquid starting material prior to its dispersion in the aqueous suspending medium. Suitable catalysts include peroxide compounds, such as benzoyl peroxide, lauroyl peroxide, tert-butyl peracetate, isopropylperoxy dicarbonate, and like. If desired, radiation, such as high energy ionizing radiation, may be used as the polymerization initiator.

The limited coalescence system is highly sensitive to impurities, especially when polymerizing monomers having a high vinylidene halide content. Inadvertent contamination by reactor agitator shaft seal oil, for example, after the stable droplets have been formed will result in non-uniform particle sizes and can destroy suspension stability. If the oil is dissolved in the monomer liquid starting material prior to its dispersion in the aqueous medium, however, there is no appreciable effect on the system. Generally, chelating agents and plasticizers are to be avoided at all stages of the process, as they are also detrimental to suspension stability.

In order to ensure stability of the suspension, it is desirable to inhibit polymerization prior to the formation of the stable droplet suspension. Beneficially, the polymerizable mixture should be maintained at about 15° C. or below prior to the formation of the stable suspension, or, alternatively, a minor proportion, e.g., about 50 parts per million parts of the total suspension mixture, of a polymerization inhibitor such as a mono methyl ether of hydro quinone can be added. Higher proportions of the polymerization inhibitor, e.g., about 100 parts per million, will interfere with polymerization when it is desired.

In a similar manner, refluxing of the polymerizable monomer, e.g., from the top surface of a polymerization autoclave, should be avoided since the refluxed monomer will form undesirably large particles in the present system due to the essential lack of agitation. Insulating or jacketing the reactor, especially the upper surfaces, should reduce this problem. In addition, beneficial results can be obtained by reducing the amount of free space in the polymerization reactor.

The following examples illustrate the invention but should not be construed as limiting its scope. Parts and percentages are by weight unless otherwise indicated or required by context.

EXAMPLE 1

In a series of experiments, monomeric materials were polymerized in suspension in aqueous media according to the method of this invention. The aqueous suspending media were first prepared according to the following recipe, and then chilled in ice to lower the temperature prior to adding the polymerizable liquid.

| | |
|---|---|
| Deionized water | 87.2 parts |
| Colloidal silica[1] | 5.7 parts |
| Promoter[2] | 0.2 part |
| Sodium chloride | 0.1 part |
| Potassium dichromate[3] | 6.8 parts |
| Hydrochloric acid[4] | |

Notes:
[1]Colloidal silica dispersion containing 30 weight percent solids in water, available under the trade name of "Ludox HS".
[2]Aqueous solution containing 10 weight percent of a copolymer prepared from diethanol amine and adipic acid in equimolar proportions by a condensation reaction to give a product having a viscosity of about 100 centipoise at 25° C.
[3]Aqueous solution containing 0.065 g/liter sodium dichromate.
[4]Added to adjust the pH to 4.0.

Next, the oil phases were prepared by admixing 63.8 parts of vinylidene chloride monomer and 0.11 part sec-butyl peroxydicarbonate as the initiator. At all times the oil phases were chilled in ice to inhibit polymerization.

In each experiment, an oil phase and aqueous medium were mixed with violet agitation in a commerical home blender, with blades rotating at about 10,000 rpm, for about one minute. The blend was allowed to coalesce in a container chilled with ice. Next, 6.4 parts of a two weight percent aqueous dispersion of the desired viscosity grade hyroxypropyl methyl cellulose was added to the blend with gentle agitation and the mixture was placed in a cold (about 20° C.) 3 liter glass pipe reactor of 4 inches diameter, equipped with a 3 inch, 3 blade propeller-type agitator and a heating/cooling jacket. Oxygen was removed from the reactor with a nitrogen purge and the vessel was sealed and heated to 50° C. Throughout the reaction, the mixture was gently agitated with agitator speed of 150 rpm so as to assist heat transfer within the reactor. After about 16 hours, i.e., when the pressure in the reactor fell and leveled off, the temperature was lowered and the polymer-containing suspension was removed from the reactor. The suspension, having the appearance of a white, milky liquid, was then screened through a 325 mesh (44 micron) screen to determine the size of the so-formed polymer beads. The results are shown in Table I.

TABLE I

| Test | Methyl Cellulose Viscosity[1] (Centipoise) | Percent Passing Through 325 Mesh |
|---|---|---|
| 1.1[2] | None Added | 0 |
| 1.2[2] | 400 | 42 |
| 1.3[2] | 100 | 42 |
| 1.4[2] | 35 | 37 |
| 1.5 | 5.1 | 87 |
| 1.6 | 3.7 | 97 |
| 1.7 | 2.9 | 98 |

Notes:
[1]Viscosity of a 2 weight percent dispersion in water, measured at 20° C.
[2]Control - not an example of the invention.

Tests 1.1 to 1.4 are included for comparative purposes, and are not examples of the invention. In test 1.1, wherein no methyl cellulose was added, the reaction mixture set up, resulting in a solid polymer mass. This demonstrates the need for the stabilizing additive when preparing normally crystalline vinylidene halide polymers by a limited coalescence suspension polymerization system. Tests 1.2–1.7 demonstrate the beneficial results obtainable by using a low molecular weight methyl cellulose as the stabilizing additive, and Tests 1.5–1.7 show the surprising effectiveness of a methyl cellulose having a viscosity grade less than about 35 centipoise.

EXAMPLE 2

To examine the effect of the agitator speed during polymerization, a series of experiments were performed using a recipe and method similar to that in Example 1, but varying the speed of the reactor agitator. In these experiments hydroxypropyl methyl cellulose having a viscosity grade of 2.9 centipoise was used as the stabilizing additive. The results are shown in Table II.

TABLE II

| Test | Agitator Speed (rpm) | Percent Passing Through 325 Mesh |
|---|---|---|
| 2.1 | 450 | 0 |
| 2.2 | 300 | 90 |
| 2.3 | 200 | 98 |
| 2.4 | 0 | 99.8 |

In the polymerization of vinylidene chloride monomers by limited coalescence suspension, the removal of heat of polymerization becomes important when the polymerization is carried out in reactors larger than beaker-size. In order to maintain a uniform temperature throughout the suspension, some agitation is desirable. If the agitation speed is great enough to reduce the droplets to below the stable limiting size, e.g., by shearing the droplets, a non-uniform, unpredictable particle size distribution will result. Such a result is not contemplated by the present invention. If the agitator speed is not so great as to shear the droplets, but high enough to cause the droplets to collide and unite, an undesirably larger and non-uniform particle size will result, as shown in Table II. Though the results shown in Table II cannot be accurately extrapolated to larger vessels and different agitators, they do represent the effect of agitator speed on particle size obtained by limited coalescence suspension polymerization. Guided by these results, one can determine the desired balance between heat transfer and particle size for each system in which the polymerization according to the teachings of this invention is to be carried out.

EXAMPLE 3

Using a recipe and method similar to that in Example 1, but using hydroxypropyl methyl cellulose having a viscosity grade of 3.69 cp and a polymerizable liquid comprising 93 percent vinylidene chloride and 7 percent butyl acrylate, 98 percent of the resulting polymer beads passed through a 325 mesh screen.

What is claimed is:

1. In a process of making solid bodies of normally crystalline vinylidene halide polymers in the form of spheroidal globules comprising the steps of forming a mixture of a polymerizable liquid and an aqueous non-solvent liquid medium, the non-solvent liquid medium containing a water-dispersible, water-insoluble, colloidal solid particle emulsifier; mechanically agitating the mixture to disperse the polymerizable liquid as smaller-than-stable droplets in the non-solvent liquid medium; bringing the resulting unstable dispersion to a condition of quiescence, whereby the unstable droplets undergo a limited coalescence to form a stable suspension of droplets; treating the stable suspension with a stabilizing agent to prevent agglomeration of the droplets; and thereafter subjecting the suspension to polymerization conditions without high turbulence;

the improvement which comprises employing in combination colloidal silica as the solid particle emulsifier, and a low molecular weight, non-ionic, water-soluble cellulose ether, having a viscosity grade of about 5 centipoise or less, as the stabilizing agent.

2. The process according to claim 1 wherein the cellulose ether is hydroxypropyl methyl cellulose.

3. The process according to claim 1 wherein the amount of cellulose either ranges from about 0.06 to about 0.26 percent of the weight of the aqueous non-solvent liquid medium.

4. The process according to claim 1 wherein the polymerizable liquid is vinylidene chloride.

5. The process according to claim 1 wherein the polymerizable liquid comprises vinylidene chloride and butyl acrylate.

6. The process according to claim 1 wherein the spheroidal globules are of a size less than about 40 microns in diameter.

7. The process according to claim 1 wherein the pH of the aqueous non-solvent liquid medium is adjusted to not greater than about 4.5 prior to forming the mixture with the polymerizable liquid.

* * * * *